United States Patent

Presby

[11] Patent Number: 5,647,041
[45] Date of Patent: Jul. 8, 1997

[54] MULTIMODE FIBER BEAM COMPRESSOR

[75] Inventor: Herman M. Presby, Highland Park, N.J.

[73] Assignee: Lucent Technologies Inc., Murray Hill, N.J.

[21] Appl. No.: 633,333

[22] Filed: Apr. 17, 1996

[51] Int. Cl.$^6$ ........................................ G02B 6/26
[52] U.S. Cl. .................. 385/43; 385/31; 385/33; 385/39; 385/96; 385/123
[58] Field of Search ................ 385/15, 14, 31, 385/33, 34, 38, 39, 43, 49, 123, 128, 96, 98, 88

[56] References Cited

U.S. PATENT DOCUMENTS

| | | | |
|---|---|---|---|
| 3,756,688 | 9/1973 | Hudson et al. | 385/43 X |
| 3,901,581 | 8/1975 | Theil | 385/43 X |
| 3,962,702 | 6/1976 | Kriege | 385/43 X |
| 4,060,308 | 11/1977 | Barnoski et al. | 385/43 X |
| 4,445,751 | 5/1984 | Divens et al. | 385/43 X |
| 4,697,867 | 10/1987 | Blanc et al. | 385/43 X |
| 4,763,976 | 8/1988 | Nolan et al. | 385/43 X |
| 4,784,466 | 11/1988 | Khoe et al. | 385/43 X |
| 5,192,863 | 3/1993 | Kavehrad et al. | 385/43 X |
| 5,271,079 | 12/1993 | Levinson | 385/46 |
| 5,333,218 | 7/1994 | Ortiz, Jr. | 385/43 |
| 5,361,314 | 11/1994 | Kopelman et al. | 385/12 |
| 5,430,813 | 7/1995 | Anderson et al. | 385/12 |

Primary Examiner—Brian Healy

[57] ABSTRACT

An optical beam compressor formed of light transparent material for compressing optical signals emitted from an end of an optic fiber. The compressor has a substantially tapered shape extending between a first surface or base having a cross-sectional area, and a second surface or head having a cross-sectional area less than the base area. The compressor has an index of refraction greater than the index of refraction of the environment in which it is disposed, and can be positioned between the end of the optic fiber and a photodetector. Optical signals are provided from the free end of the fiber to the base of the compressor wherein the signals are compressed and transmitted or directed to the photodetector for detection.

10 Claims, 1 Drawing Sheet

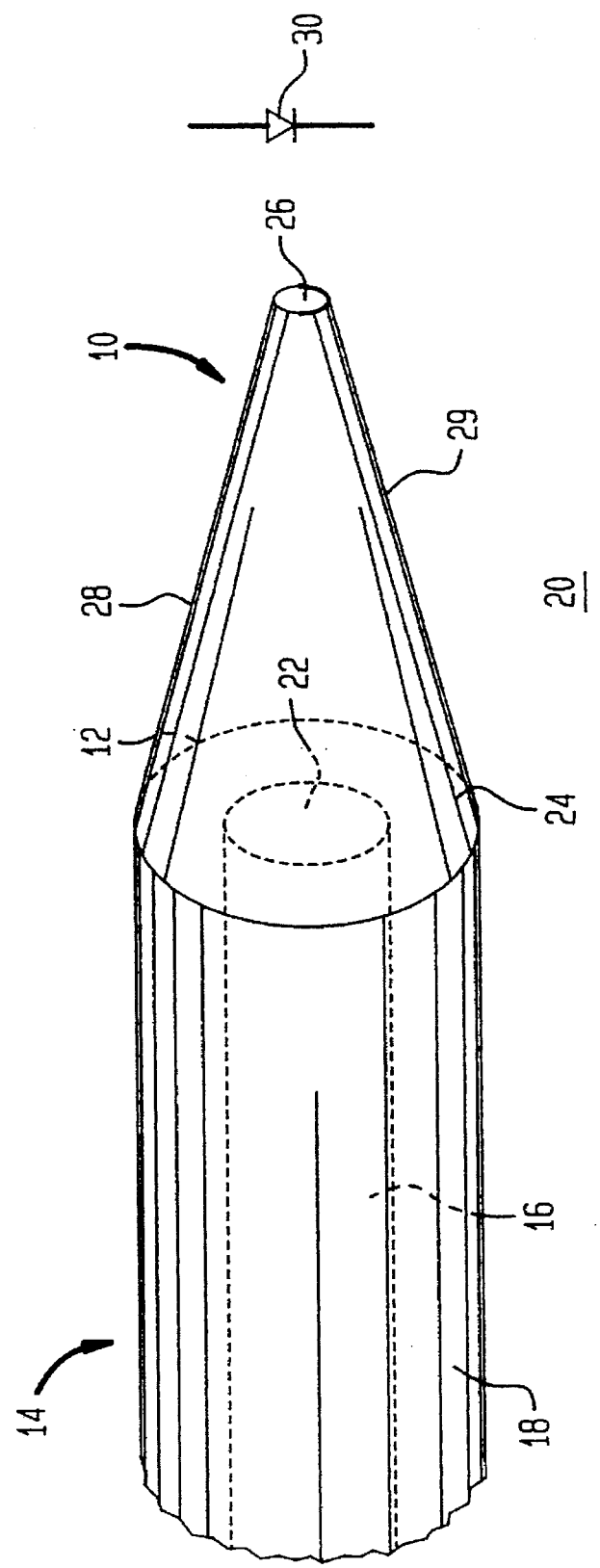

MULTIMODE FIBER BEAM COMPRESSOR

BACKGROUND OF THE INVENTION

I. Field of the Invention

The present invention relates to fiber optic systems employing multimode fibers in general and more particularly to a fiber beam compressor for use in such systems.

II. Description of the Related Art

The use of optic fibers in communication systems as a medium for transporting optical signals between locations is well known. Such communication systems generate optical signals that are carried by optic fibers to a photodetector which detects and converts the optical signals to electrical signals. The corresponding electrical signals can then be further processed by electronic circuitry.

The two types of commonly used optic fibers are single mode and multimode fibers. Although single mode fibers, which provide only one mode of propagation for optical signals have a greater signal carrying capacity than multimode fibers, the comparatively smaller core size of single mode fibers makes such fibers difficult to join or connect with like single mode fibers. Thus, use of single mode fibers is normally limited to high speed specialized applications.

Multimode fibers, on the other hand, have a relatively larger core than single mode fibers, which makes them easier to join with like fibers. The larger core is also more efficient for launching optical power therein. However, due to the hundreds of propagation modes that such fibers possess, multimode fibers suffer from intermodal dispersal and, thus, are more limited in their information carrying capacity than single mode fibers. Nevertheless, multimode fibers find many applications in certain fiber optic communication systems which do not require the highest transmission rates.

The rate of data transfer in fiber optic communication systems is limited by many factors, one of them being the photodetector which detects the transmitted optical signals. It is desirable for a photodetector, such as a p-i-n photodiode, to detect all (as opposed to a portion) of the light that is carried by the fiber. Thus, photodetectors having detection areas substantially equal to the cross-sectional areas of the cores of fibers carrying the optical signals are preferred. When multimode fibers are used, larger photodetectors are required because of the larger core sizes.

However, larger photodetectors suffer from decreased detector response time because such photodetectors possess larger intrinsic regions which correspond to longer distances across which the charged carriers have to travel for detection. Although there exist several techniques which may increase the detection rate in a fiber optic system, as for example by using a smaller detector, such techniques typically waste a portion of the photons carried by the fiber which is clearly highly undesirable.

SUMMARY OF THE INVENTION

The invention is based on the realization that decreased photodetection times can be achieved in a system with a multimode optic fiber by interfacing such fiber with a relatively small photodetector using an optical beam compressor of a particular configuration. Such a beam compressor is formed of a light transparent material having a substantially tapered shape with an outer wall, a first end or base and a second end or head, and an index of refraction at least 5% greater than the index of refraction of a surrounding environment. The base end of the compressor is configured for coupling to the fiber end and has a cross-sectional area at least equal in size to the cross-sectional area of the fiber core portion. The head end is spaced a distance from the base and is dimensioned so that its cross-sectional area is smaller than the cross-sectional area of the base. Such a spacing distance should be such that optical signals received by the base from the fiber are transmitted to the head end by total internal reflection within the compressor. In this manner, the compressor compresses the optical signals and provides them to a relatively small photodetector without delay.

It is possible to form such a beam compressor from silica glass. To further improve containment of the optical signals within the tapered outer wall of the beam compressor, the outer wall is coated with a metallic or metallized material.

A beam compressor in accordance with the invention is also advantageous in other applications without a photodetector adjacent the compressor head, such as medical applications requiring compressed beams of light e.g. laser surgery and dermatology procedures.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWING

The single FIGURE depicts a perspective view of an exemplary fiber beam compressor in accordance with the invention shown operatively interfaced between a multimode fiber and a photodetector.

DETAILED DESCRIPTION OF THE PREFERRED EMBODIMENT

An exemplary multimode compressor 10 in accordance with the invention is depicted in the FIGURE. The beam compressor of the invention is particularly useful for interfacing a multimode optical fiber to a photodetector for detecting received optical signals in a communication system. Accordingly, the depicted compressor in the FIGURE is described with respect to such an application. However, such a description is for illustration purposes only and is not meant to be a limitation of the invention. Other applications in which the invention is useful include, for example, focusing of multimode light signals in medical applications such as laser surgery and dermatology procedures.

The compressor 10 has a first end or base 24 configured for connection to an optical fiber end 12. The base 24 is fastened or secured or otherwise disposed in proximate optical communication relation to a termination end 12 of a multimode optic fiber 14 having a central core portion 16 surrounded by a layer of cladding 18. The fiber end 12 is shown having a core end 22 coterminous therewith. Compressor 10 and fiber end 12 are disposed in an environment 20, such as air, having a known or predetermined or determinable index of refraction. Base 24 has a cross-sectional area which is at least equal in size to the cross-sectional area of core 16 so that all of the optical signals carried by the core are transferred to base 24 of compressor 10. In the FIGURE the base 24 has a cross-sectional area approximately equal to the combined cross-sectional area of the core 16 and cladding 18 of the fiber. The particular method of securing the compressor 10 to or positioning the compressor 10 relative with the fiber 14 is not critical to practicing the invention. It is possible to fasten the base 24 of the compressor 10 to the fiber termination end 12 by, for example, fusing, soldering or securing with a fiber index matching adhesive.

Compressor 10 also includes a second end or head 26 distally displaced from base 24 and axially aligned with the core end 22. Head 26 has a cross-sectional area which is smaller than the cross-sectional area of base 24. In the depicted embodiment, it is advantageous for the cross-sectional area of the compressor head 26 to be on the order of a detection area of a photodiode 30 placed in close proximity to head 26. The compressor 10 has a tapered outer wall 29 between the base 24 and head 26. Such a configuration substantially causes the optical signal compression for optical signals entering base 24. The compressed signals are directed to and exit the head end 26 for detection by photodetector 30. The distance between the base 24 and the head 26 is such that optical signals entering the base 24 are transmitted to the head end by total internal reflection and/or directly through the center axis of the compressor 10. For instance, it is possible for the head 26 to be spaced a distance from base 24 that is at least five times the diameter of the base 24. An exemplary range for a compressor head diameter is between 10–30 μm for use with communication type fibers having thicknesses in the range of 125–250 μm with a core diameter ranging between 50–100 μm.

The extent of optical signal compression is substantially determined by the difference in the refraction index of the compressor 10 relative to a surrounding environment 20. The compressor 10 should be formed of a homogeneous dielectric material having an index of refraction at least 5% greater than the index of refraction of the environment in which the compressor 10 is operatively disposed. Such a relationship between the refraction indices substantially causes optical signals or light entering the compressor base 24 to be reflected off of the tapered wall 29 back into the compressor body 28 for directed transmission, through compressor head 26. For instance, in an air environment 20 having a refractive index of approximately 1.0, it is possible to use a compressor 10 formed of pure or doped silica glass having a refractive index typically in the range of approximately 1.457 to 1.557. Suitable dopants include germanium, phosphorus and titanium.

The ratio of the compressed light, i.e. the light emitted from head 22, to the original light, i.e. the light entering compressor 10 through base 24, is given by the formula $$R=NA/n$$

where NA represents the numerical aperture or difference in the refractive indices of the core and cladding, and n represents the index of refraction of the compressor. For a typical optic fiber having an NA of 0.02 and a compressor comprised of silica glass having an index of refraction of 1.5, R=13%. Thus, using this embodiment the width of the optical signals entering base 24 can be reduced by 13% of the original width. As will be appreciated, a smaller width allows use of a detector having a smaller detection area and providing an improved detector response time. To further prevent the optical signals entering base 24 from passing or being reflected outward through wall 29, it is advantageous for the wall 29 to be coated with a substantially reflected material such as, for example, a metal including gold.

The cross-sectional area of the base 24 should at least cover the cross-sectional area of the core end 22. However, for ease of attachment to the fiber 14, it is desirable that the base 24 cover the entire optic fiber end 12, i.e. the core and cladding. The dimension of the cross-sectional area of head 26, on the other hand, is limited by the angle of incidence between the incoming light and head 26. It is known that when the angle of incidence between a light ray and a surface approaches a minimum threshold value, the light ray will be reflected back away from the surface. Thus, to facilitate transmission of a substantial portion of the optical signals from base 24 to head 26, the cross-sectional area of head 26 should be dimensioned to avoid such reflection of the compressed optical signals.

While there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A fiber beam compressor comprising:
   a light transparent material having a substantially tapered shape between first and second ends;
   said first end capable of coupling to an optical fiber end, wherein said first end has a cross-sectional area that is at least the size of a cross-sectional area of a core of said fiber, said material having a substantially uniform index of refraction that is at least equal to an index of refraction of said fiber core and at least 5% greater than an index of refraction of a surrounding environment; and
   said second end having a cross-sectional area smaller than said first end and being spaced from said first end such that a substantial portion of light entering said first end is transmitted to said second end by total internal reflection within said material.

2. The beam compressor of claim 1 wherein tapered surfaces of said material are substantially coated with a metal.

3. The beam compressor of claim 1 wherein said spacing between said first and second ends is at least five times a diameter of said first end.

4. The beam compressor of claim 1 wherein said fiber and said first end are coupled by fusing.

5. The beam compressor of claim 1 wherein said fiber and said first end are coupled by an index matching adhesive.

6. The beam compressor of claim 1 wherein said fiber and said first end are coupled by solder.

7. The beam compressor of claim 1, wherein said light transparent material comprises silica glass.

8. The beam compressor of claim 2, wherein said first end has a diameter and wherein said second end is displaced from said first end by a distance of at least five times said diameter of the first end.

9. The beam compressor of claim 8, wherein said first end is configured to facilitate attachment to the fiber end by fusing.

10. The beam compressor of claim 9, wherein said light transparent material comprises silica glass.

* * * * *